April 2, 1968
R. W. BARTHEL
3,376,482
REBALANCING SYSTEM USING MULTIPLE FORCE
RANGE MOTOR AND POWER SOURCE
Filed Nov. 17, 1964
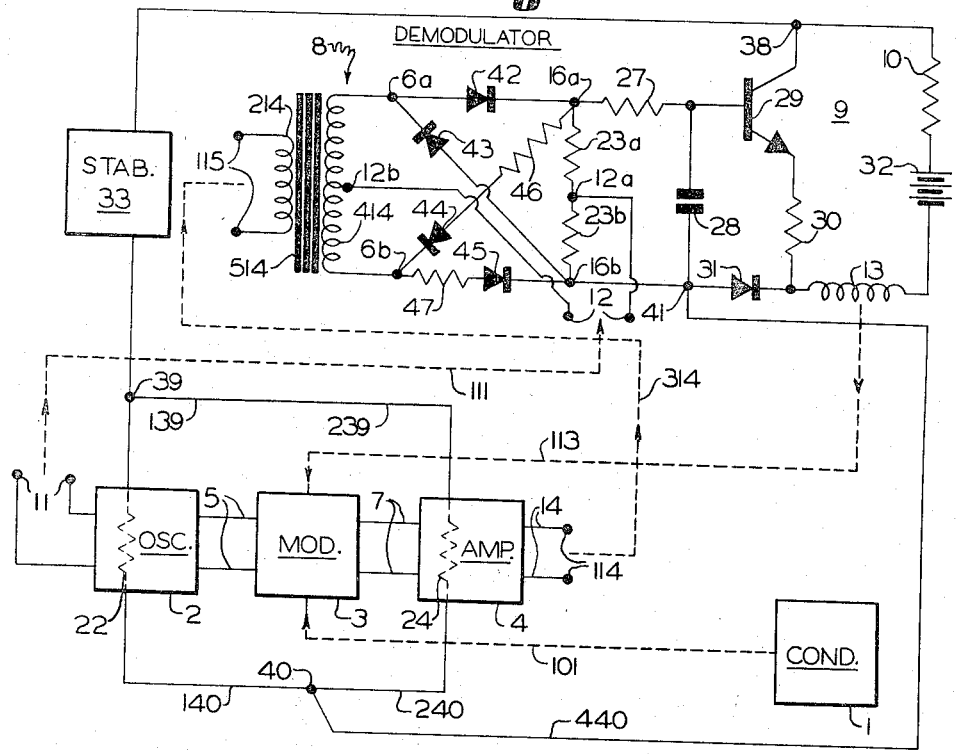
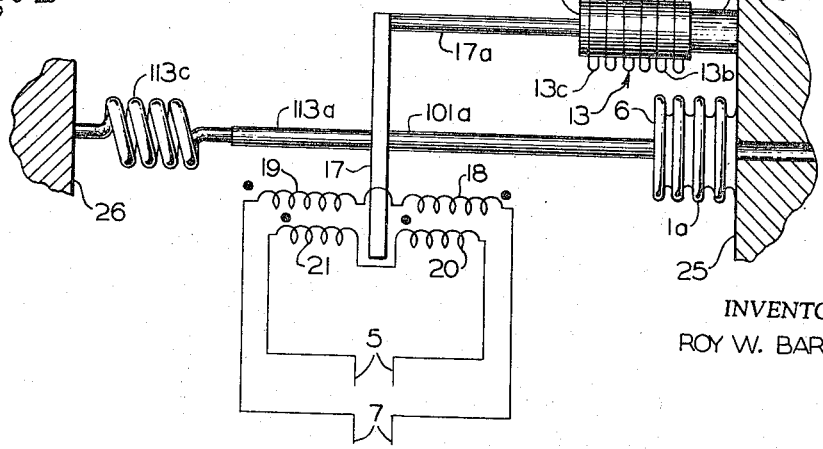
INVENTOR.
ROY W. BARTHEL

United States Patent Office 3,376,482
Patented Apr. 2, 1968

3,376,482
REBALANCING SYSTEM USING MULTIPLE FORCE RANGE MOTOR AND POWER SOURCE
Roy W. Barthel, Penfield, N.Y., assignor to Taylor Instrument Companies, Rochester, N.Y., a corporation of New York
Filed Nov. 17, 1964, Ser. No. 411,875
9 Claims. (Cl. 318—32)

ABSTRACT OF THE DISCLOSURE

In a force balance transduction system, the balancing force is created by a feedback coil having two sections in circuit with a source of DC current, the current through the coil being a measure of the balancing force. A switch is provided which switches one section of the coil into or out of circuit with said source. This provides a range change for the system. The system is adjusted for the desired accuracy of range for the one-section condition. When the other section is switched in, a second source of DC is switched into the coil circuit. This second source may be adjusted to restore the desired accuracy.

---

This invention relates to transduction systems and improvements therefor, particularly in respect of systems of the solid state type.

One object of the invention is to provide such system with improved temperature stability.

Another object of the invention is to provide such system with a range or span changing feature.

Other objects of the invention will be apparent from the description and claims appended hereto.

In the type of system under consideration, information in the form of a motion position change, force, and so on, expressive of the value of a variable condition, is converted to corresponding electrical signals, and ultimately to the flow of direct current in a single closed loop, the arrangement being that the amplitude of said direct current reflects said information and is produced by a current source in said loop. Consequently, a suitable load impedance can be included in said loop, for utilizing the information borne by said direct current, yet can also be located at great distance from the remainder of said system. Further, by providing the system in solid state form, all the actual DC power involved may be obtained from a relatively low voltage battery in said loop. As a result, the system according to the present invention has the advantages of compactness, reliability, safety and a minimum of electrical transmission lines attached thereto. This is in contrast to an analogous system using AC mains for power, and vacuum tubes as circuit elements.

In the drawings,

FIGURE 1 shows generally a transduction system of the character referred to supra, together with the certain improvements according to the invention, whereas FIGURE 2 illustrates a force-balance version of the system of FIGURE 1.

In the present application, FIGURES 1 and 2 correspond, respectively, to FIGURES 1 and 2 of the copending application for U.S. Letters Patent of Chung-Chuan Liu, Ser. No. 413,110 filed Nov. 23, 1964, entitled Transduction System Including Current Regulation, and assigned to the assignee of the present application, now U.S. Letters Patent No. 3,322,971, May 30, 1967. To the extent that structural parts, circuit elements, etc., are or may be the same, they have been denoted by the same reference characters as in the above-identified Liu application. Moreover, the manner of system operation is the same in both this application and the Liu application, except as is now to be described. Hence, overall operation of the system will not be described herein except insofar as is necessary to do so in connection with the improvements disclosed herein.

Turning to FIGURE 1, it will be observed that reference numeral 8 generally denotes a demodulator circuit array consisting essentially of diodes 42, 43, 44 and 45, and resistors 46 and 47, which elements therefore form contents of box 8, FIGURE 1 of the above-identified Liu application, wherein no specific form of modulator (as said box 8 was termed) is portrayed.

Again, amplifier 4 and demodulator 8 may be coupled by a conventional transformer including primary winding 214 and secondary winding 414, each coupled to the other by an iron core 514, the ends of winding 214 terminating in terminals 115, and the ends of winding 414 terminating in terminals 6a and 6b. Terminals 115 are coupled via coupling means 314 (simply a pair of wires, say) to corresponding terminals 114 terminating the connections 14 which, in the above-identified Liu application, represented the coupling between amplifier 4 and demodulator 8.

Further, in present FIGURE 1, a pair of series-connected resistors 23a and 23b are connected across the input terminals 16a and 16b (corresponding to the terminals 16 of the aforesaid Liu application) of the load circuit 9, and the reference signal terminals 12 of the demodulator 8 are connected, one to a center tap 12b of winding 414 and the other to the junction 12a between resistors 23a and 23b. Resistors 23a and 23b, together, therefore correspond to the equivalent resistance 23, FIGURE 1 of the aforesaid Liu application.

Demodulator 8, as shown in FIGURE 1, is conventional, insofar as are concerned the general configuration of diodes 42 through 45, winding 414, and its respective connections to amplifier 4 and oscillator 2. Briefly, the demodulator 8, as thus far described is a full-wave, phase-sensitive rectifier which rectifies the AC voltage across winding 214 (or, rather, the voltage induced in winding 414 and having a value that is some given fraction or multiple of the AC voltage in winding 214), compares the phase of said voltage to that of the voltage across terminals 12, and produces at terminals 16a and 16b a DC voltage having a polarity depending on the relation between the said phases and the amplitude of the first said AC voltage.

According to the invention, I provide resistors 46 and 47, the former connecting the anode of diode 44 to the terminal 16a joining resistor 23a and resistor 27, and the other connecting both the cathode of diode 44 and the terminal 6b of winding 414 to the anode of diode 45. The purpose of resistors 46 and 47 is to compensate the modulator 8 for the loss in gain of transistor 29 at low temperatures.

Generally speaking, as the temperature of a transistor decreases, the higher is the base voltage required to produce a given current in the load circuit 9. The system of FIGURE 1 will attempt to supply the required increment of base voltage, but at higher values of base voltage, it is possible to turn on one or another diode of modulator 8, when such diode is supposed to be off, thereby limiting the voltage at the base of the transistor to the value required to turn such diode on. For example, the load circuit, demodulator, etc., may be designed such that the load current due to transistor 29 varies over the range (0–16) ma. DC, for a given range of variation in the condition responded to device 1. As in the system disclosed in the application of Liu, above-identified, current stabilizer or regulator 33 draws a fixed 4 ma. DC from load circuit 9. Therefore, at some value of said condition, a total of 20 ma. DC through winding 13 will produce just the right amount of feedback via coupling 113 that the output of modulator 3 is limited to a value such that the resultant base voltage of transistor 29 causes the transistor to have 16 ma. flowing between collector and emitter. That is, modulator 3 and amplifier 4 are designed so that the voltage across winding 214, and therefore the voltage across capacitor 28, continues to change until such time as the effect of changed current through coil 13 establishes a feedback effect preventing further change in base voltage. As is well known, the result is that at any instant the load current magnitude closely represents the value of the variable condition. Moreover, for all changes in the condition falling within a certain range and persisting for at least a certain length of time, the load current adjusts its value in correspondence with such changes. However, as transistor temperature decreases, the change in base voltage required to cause a given coil current change increases.

The voltage across capacitor 28 is essentially that across terminals 16a and 16b. Considering the times when the common junction, at terminals 6a, of diodes 42 and 43 (i.e., the upper end of winding 414) is positive, and the reference voltage across tap 12b and junction 12a has turned diode 44 on, diode 45 is supposed to be off. However, if the voltage across capacitor 28 is large enough at this time, it is possible that diode 45 thereby may be turned on. If this happens, then the voltage across capacitor 28 is limited to a value corresponding to the value of voltage across terminals 16a and 16b that just results in diode 45 turning on. Whether this happens or not depends on the transistor's low-temperature characteristic. In practice, most types of presently-available transistors become sufficiently insensitive to base voltage change at low temperatures that at higher values of coil current, corresponding base voltage requirements cause the above-described limiting action of a demodulator diode to prevent the transistor from providing the value of coil current corresponding to the value of the variable condition. In a typical case, the normal range of load current due to transistor 29 may be (0–16) ma. at room temperatures and above. Depending on the particular transistor, if the transistor temperature falls below this range of temperatures, the possible range of coil current due to transistor 29 may narrow to (0–15) ma., or less.

It is the function of resistors 46 and 47 to prevent the aforesaid limiting action. Considering the case where diode 44 is on and diode 45 is supposed to be off, resistor 46 is so proportioned as to drop sufficient voltage that the anode of diode 45 remains more negative than its cathode, the effect being chosen to be large enough that the voltage across terminals 16a and 16b is never required by the transistor's low-temperature characteristic to be so high as to limit base voltage to a value less than is needed to give 20 ma. of total coil current when the value of the variable condition calls for 16 ma. from transistor 29.

When terminal 6a, i.e., the upper end of winding 414, is negative, diode 44 is supposed to be off, while diode 45 is supposed to be on (i.e., turned on by the reference voltage across tap 12b and junction 12a). Here the sense of the voltage across terminals 16a and 16b has not changed, whereas now diode 45 is forward-biased. Diode 44 is back-biased, and therefore off, so long as the drop across resistor 47 is enough to keep the cathode of diode 44 positive with respect to its anode.

The foregoing assumes that the bias on the diodes at any instant is solely that due to the reference voltage. In practice, the reference voltage is made large enough that it is always sufficiently large compared to the signal voltage, say ten or more times larger at any instant, that the contribution of signal voltage to diode bias is negligible. Again, the foregoing pre-supposes that each of resistors 46 and 47 contributes to diode bias only when current flows therethrough due to conduction of the corresponding one of diodes 44 and 45. However, as there is a slight amount of leakage in the non-conducting one of these diodes, leakage current through the corresponding resistor contributes a drop aiding the drop due to the current through the other resistor, which is in series with the conducting diode.

The description, supra, of demodulator operation applies to the case where tap 12b and terminal 6a have the same polarity. However, if the sense of the phase relation between the output of the modulator and oscillator reverses, then tap 12b and terminal 6a have opposite signs. The demodulator then acts to put a negative voltage on the base of transistor 29, but at about this point, the load current through load resistance 10 reaches its nominal 4 ma. minimum, and the variable condition is going outside the range thereof to be represented by said load current.

In a conventional demodulator, resistances 23a and 23b would be equal. However, the dissymmetry introduced by resistances 46 and 47 apparently causes the voltage across terminals 16a and 16b, if resistances 23a and 23b are equal, to be less than expected. According to the invention, such reduction is substantially prevented by using unlike values of resistors 23a and 23b, the former being chosen to be larger than the latter. In practice, it is necessary to try out different values of resistor 23a in order to ascertain the value thereof giving the best results.

In practice, circuit values, as follows, may be used:

| | |
|---|---|
| Diodes 31, and 42 through 45 | IN458 |
| Transistor 29 | 2N1711 |
| Capacitor 28 microfarads | 100 |
| Resistor 23a ohms | 6800 |
| Resistor 23b do | 4700 |
| Resistor 27 do | 330 |
| Resistor 30 do | 15 |
| Resistors 46 and 47 do | 2200 |
| Battery 32 volts | 24 |

It is to be noted that resistors 46 and 47 could be replaced by diodes having suitable values of forward resistance, such diodes being substituted with their electrodes polarized so that the current conducted and dropped by the resistors 46 and 47, instead is conducted by the diodes and dropped by the forward resistances of the conducting diodes.

Total resistance of load circuit 9 may vary up to several thousand ohms, and the system is typically constructed and arranged such that the voltage across winding 414 has a range variation of approximately minus one volt to plus one volt, whereas the expected range of variation of the condition responded to by condition responsive device 1 corresponds to a signal voltage variation of about (0 to 1) volt. The load circuit 9 is therefore designed so that for a one volt change of base voltage, the transistor's collector-emitter current normally ranges from (0 to 16) ma. Since stabilizer 33 is set to draw approximately 4 ma. from the load circuit 9 at all times, as disclosed in the above-identified Liu application, therefore the normal range of current through load resistance 10 is (4 to 20) ma. DC.

I have illustrated in FIGURE 2 the rudiments of how a force-balance scheme might be realized in the system of FIGURE 1, just so much of the system of FIGURE 1 being reproduced in FIGURE 2 as will indicate the relation of the additional detail of FIGURE 2 to the system shown in FIGURE 1.

In FIGURE 2, condition responsive device 1 is portrayed as a bellows 1a, having a movable end 6 that moves to the right and the left, as the difference in the internal and external pressures acting on the bellows decreases and increases, respectively. Coupling 101 is portrayed as a rigid rod or stem 101a, and coupling 113 as a rigid stem 113a and a spring 113c, the arrangement being that as bellows 1a expands, spring 113c yieldingly resists such expansion. As stems 113a and 101a move, a ferromagnetic armature 17 rigidly mounted thereon, is bodily translated along with the stems. The position of the armature is sensed by modulator structure including windings 18 through 21. Winding 18 is fixed in inductive relation to winding 20, and winding 19 is fixed in inductive relation to coupling 21. Windings 18 and 19 are connected in series with each other and are wound in the senses indicated by the dots at the ends thereof. Windings 20 and 21 are also connected in series with each other and are wound in a sense indicated by the dots at the ends thereof. As said dots indicate, windings 20 and 21 are in series-aiding connection, but windings 18 and 19 are in series-opposing connection. Therefore, if winding 20 is otherwise like winding 21, and winding 18 is otherwise like winding 19, then if the windings 20 and 21 are connected to output connection 5 of oscillator 2, as shown, (and neglecting the effect of armature 17) then equal and opposite voltages will be induced in windings 18 and 19, and the voltage across connections 7 will be zero. Moreover, if in a given position of the armature 17, said armature provides flux linkage between windings 18 and 20 the same as it produces between windings 19 and 21, the net voltage across connections 7 remains zero. However, if armature 17 is moved to a position to the right or the left, one said flux linkage will decrease and the other will increase, and a corresponding disparity between the voltages induced in windings 18 and 19 will arise, whereby the net voltage across terminals 7 attains a value other than zero, which corresponds to the new armature position, and has a sense of phase relationship, with respect to the oscillator output on connections 11, that corresponds to the sense of position change of armature 17. Taking the aforesaid given position of armature 17 as zero position, then the sense of change from that position is given by the polarity of the voltage across terminals 16, FIGURE 1.

Feedback force is exerted on armature 17 by means of a rigid stem 17a affixed at one end to armature 17, and having a coil 13 affixed to its other end. In order to convert coil current to force, a rigid ferrous core 113b fixedly positioned so as to project inside a non-magnetic coil from 113d, upon which coil 13 is wound and fixed in place, the arrangement being that as DC current through the coil increases, the magnetic field created by such current interacts with core 113b to generate a force tending more and more strongly to urge coil 13 to the left. Coil 13 and core 113b, in short, provide the basic elements of a so-called "voice coil motor" commonly used in force-balance systems as a source of feedback force. A typical example of such a "motor" is the "Electromechanical Transducer" described and claimed in U.S. Letters Patent No. 3,009,084 to C. G. Balliett, issued Nov. 14, 1961 and assigned to the assignee of the present invention.

Accordingly, amplifier 4, demodulator 8 and load circuit 9 will be arranged so that a change in voltage across connections 7 due to a movement of armature 17 from the zero position, produces a change in the coil force such as returns armature 17 to the zero position thereof. In effect, therefore, change in the compressive force of bellows 1a on spring 113c is accompanied by an equal and opposite change in the contribution of coil 13 to the compressive force of bellows 1a on said spring. As changes in bellows force correspond quantitatively to changes in the difference between the internal and external pressures acting on the bellows, the intensity of the current through coil 13 is a measure of the said difference.

It is to be noted that the said compressive force arises by virtue of the fact that one end of the bellows and one end of spring 113c are fixed respectively to fixed structure, such as symbolized at 25 and 26, FIGURE 2, providing fixed points on some rigid structure such as a base, casing or the like (not shown), incorporating the structure shown in FIGURE 2, which structure also fixedly mounts core 113d.

It will be observed that in present FIGURE 2, coil 13 moves with respect to the fixed core 113b, whereas in FIGURE 2 of the aforesaid Liu application, the coil is assumed to be fixed, whereas the core moves. Insofar as the present invention is concerned, either arrangement could be used.

Moreover, as thus far described, the force-balance arrangement shown in FIGURE 2 is not unlike the prior art, except that an actual example thereof would usually be realized in considerably more complex structural terms. However, the main purpose of FIGURE 2 is to illustrate how, according to the invention, span change may be provided in a force-balance version of the system of FIGURE 1, by means that are now to be described.

According to FIGURE 2, coil 13 is composed of sections 13c and 13b. In practice, the sections form essentially one continuous coil so wound that for a given DC current through the entire coil, each turn aids the other turns in creating the magnetic field due to the current, and an intermediate tap is provided for the purpose about to be described. In FIGURE 2, such tap is denoted by reference character 48b, and the coil ends by reference characters 48a and 48c. In the present instance, the entities denoted by reference characters 48a, 48b and 48c would be, in effect, fixed terminals having flexible, slack leads 48d connecting corresponding portions of the coil to the appropriate terminals, thus allowing the coil to move yet providing for stationary electrical connections to the coil.

The span of the system of FIGURE 2 may be defined as the ratio of the magnitude of a given change in the variable condition, to the resulting change in current through coil 13. As the motions involved in the force-balance system are small, and so on, accordingly, as is well known in the art, the said resulting change in current is very nearly in straight line proportion to the thereby-caused change in the force exerted by the coil 13. Therefore, the size of the range of variable condition values corresponding to (4–20) ma. through load resistance 10 depends on how many of the total turns of coil 13 are effective in producing the net feedback force.

According to the invention, the span or range of the system may be changed simply by switching various portions of the coil 13 in or out of the circuit. Thus, for one span, both sections 13c and 13b of the coil may be used to create feedback force. To get a decreased range of condition indication, on the other hand, one or the other only, of sections 13c and 13b may be used in the load circuit 9.

Due to the fact that the load circuit 9 will tolerate considerable variation in the total resistance therein, a switch can be provided, and at considerable distances from the remainder of the system, to change the number of coil turns in series with the load current in load circuit 9. Thus, contact resistance, lead wire resistance, etc., may vary considerably without affecting the different spans established by switching the coil sections.

However, in practice, where the described span-changing feature is incorporated in systems whose performance specifications demand accuracy on the order of 0.1%, change in span may be accompanied by a change in accuracy. For example, on the new span, the current through load resistance 10 may represent the value of the variable condition to no better than 1%, more than can be tolerated in many applications of the system of FIGURE 1.

According to the invention, I supplement the above-described span or range changing feature, with a rezeroing feature, in the form of current source 50, which is adjustable (as signified by the diagonal arrow through the double-circle symbol representing source 50) to produce a DC current at such levels as may be desired in a range of several ma. DC.

In FIGURE 2, the reference character V represents a double-pole, double-throw switch having a pair of conductive switch elements 48 and 49, which may be ganged together as indicated by the dashed line therebetween. It will be observed that as shown, element 48 connects terminal 48c to the cathode of battery 32, so that save for the somewhat more elaborate illustration structure of coil 13, the load circuit 9 in FIGURE 2 is the same as in FIGURE 1. Moreover, as both sections 13a and 13b are in load circuit, there is no difference in electrical function.

If, however, element 48 is moved to contact the terminal 48b, it is evident that number of turns of coil 13 in circuit diminish, which illustrates the previously-mentioned concept of range-change by switching sections of the coil 13 in or out of load circuit 9.

Considering that the switch elements 48 and 49 are ganged and supposing that therefore element 49 moves over and contacts terminal 48c when element 48 moves over and contacts terminal 48b, section 13b is not only switched out of load circuit 9, but instead is also switched across current source 50. Since, as shown, source 50 has its cathode connected to the cathode of battery 31, coil section 13b has a DC current flowing therethrough in a direction which is reversed to that in which the current in load circuit 9 flows therethrough when section 13b is in the load circuit. Obviously, therefore, the feedback force exerted by coil section 13c, which suffers no reversal of current when switched, is diminished now by a force depending on the number of turns in section 13b and the magnitude of the current provided by source 50. As the DC output of source 50 can be adjusted, after switch V is switched from the condition shown to that described, the current through coil section 13b can be set to a level such as to correct deviation of the zero of the system.

As illustrated, the range scheme implies that coil 13 is tapped at such a point that when coil section 13b is switched out of the load circuit 9, it is known a priori that the feedback force due to section 13c will have to be diminished in order to restore the system zero. However, it is obvious that the arrangement could be that it is necessary to augment the feedback force to restore zero, thus necessitating a reversal of the connections of source 50 so that its current causes section 13b to aid section 13c. In any case, the feedback force corresponds to the effective number of turns, i.e., to the algebraic sum of the contributions of each individual turn, and of course, the system normally would be arranged so that the required accuracy is obtained with the switch V in the state pictured in FIGURE 2. If it were then desired to decrease the range of the system, switch V would be operated and the source 50 adjusted to re-zero the current through load.

By zeroing, of course, I do no necessarily mean providing for a reading of literally zero ma. on some instrument. Normally, a system of the sort described is provided with some means (not shown) for checking the accuracy of its output without more than momentarily interrupting its use, the accuracy often being judged on the basis of whether or not some predetermined value of current flows through load resistance 10 in the checking operation. As inaccuracy here would indicate substantially only "zero" error, discrepancy between said predetermined value and the actual value observed in the check, would be made up by adjusting source 50 to do so.

Current source 50 may take any of various forms now known in the prior art, and I do not believe it necessary to describe any particular example. However, it may be remarked that, presently, in the process control field, numerous so-called "set point transmitters" are available, which are basically adjustable current sources that can be set to produce fixed DC outputs in various stock ranges, such as (0–20) ma., and would be suitable for use as source 50, herein.

Having described my invention as required by 35 USC 112, I claim:

1. In a force balance system including means movable in response to a variable condition, and also including a coil having a plurality of turns and a ferrous core, said coil and said core being so constructed and arranged that a force is created by the magnetic field created by said coil when DC current flows through said plurality of turns, and said force tends to cause one of said coil and said core to move with respect to the other thereof, said one of said coil and said core being connected to said means so that such tendency of said one to move opposes motion of said means, the improvement comprising switching means constructed and arranged to connect said plurality of turns to a source of DC, when said switch is operated to a first condition, said switch means being operable to a second condition wherein a part only of said plurality of turns are connected to said source of DC current; said system also having means automatically adjusting said DC current to a value such that motion of the first said means is prevented by said force.

2. The invention of claim 1, wherein there is provided a second source of DC current, and said switch means, when operated to said second condition, being so constructed and arranged that certain of the remainder of said plurality of turns are connected to said second source of DC current.

3. The invention of claim 2, wherein said second source and said switch means are arranged such that, in said second condition of said switch means, the DC current of said second source flows through said certain of the remainder of said plurality of turns in such sense as to produce a force aiding the force produced by the DC current flow in said part of said plurality of turns.

4. The invention of claim 2, wherein said second source and said switch means are arranged such that, in said second condition of said switch means, the DC current of said second source flows through said certain of the remainder of said plurality of turns in such sense as to produce a force opposing the force produced by the DC current flow in said part of said plurality of turns.

5. A transducer system including means responsive to a variable condition to produce a first force representative of the magnitude of said condition, a source of DC current, a feedback means including a coil connected to said source and having a plurality of turns, said feedback means being constructed and arranged to produce a second force corresponding to the effective number of said turns traversed by DC current; switch means operable to control said number of turns, said switch means being operable to two conditions, in one of which a lesser number of said turns is connected to said source so that said DC current flows through said lesser number of turns and in the other of which a greater number of said turns is connected to said source so that said DC current flows through said greater number of turns; means mechanically opposing said first force to said second force, and means automatically adjusting said DC current so as to maintain a predetermined relationship between the magnitudes of said forces.

6. The transducer system of claim 5, including a second source of DC current, said switch means in its first said condition connecting turns of said coil to said second source so that the DC current of said second source flows through the last said turns, said last said turns being turns of said coil not having DC current of said first source flowing therethrough when said switch means is in said first said condition.

7. The transducer system of claim 6, wherein in the second said condition of said switch said second source is disconnected from said coil.

8. The transducer system of claim 6, wherein the current senses of said sources and the winding senses of said lesser number of turns and of said last said turns are so chosen that the force due to the latter opposes the force due to the former.

9. The transducer system of claim 6, wherein the current senses of said sources and the winding senses of said lesser number of turns and of said last said turns are so chosen that the force due to the latter aids the force due to the former.

References Cited

UNITED STATES PATENTS

| | | | |
|---|---|---|---|
| 3,009,084 | 11/1961 | Balliett | 335—217 |
| 3,083,321 | 3/1963 | Howe | 318—22 XR |
| 3,135,880 | 6/1964 | Olson et al. | 310—14 |
| 3,147,622 | 9/1964 | Weir | 73—398 |

THOMAS B. HABECKER, *Primary Examiner.*

LOUIS R. PRINCE, *Examiner.*

D. O. WOODIEL, *Assistant Examiner.*